United States Patent
Bushnell et al.

(10) Patent No.: US 7,764,776 B2
(45) Date of Patent: *Jul. 27, 2010

(54) APPLICATION SERVER COMPONENT (S) PROVIDING OF LINE-SIDE SERVICE(S) ASSOCIATED WITH NETWORK ADDRESS ON HOME NETWORK FOR USER TO TELEPHONY DEVICE ON REMOTE NETWORK FOR THE USER

(75) Inventors: William J. Bushnell, St. Charles, IL (US); Edward A. Clark, Sugar Grove, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1412 days.

This patent is subject to a terminal disclaimer.

(21) Appl. No.: 10/768,807

(22) Filed: Jan. 30, 2004

(65) Prior Publication Data
US 2005/0190906 A1     Sep. 1, 2005

(51) Int. Cl.
H04M 3/42       (2006.01)
G06F 15/16     (2006.01)

(52) U.S. Cl. .................. 379/201.01; 709/227
(58) Field of Classification Search ............ 379/201.01, 379/201.02, 207.02, 207.03, 220.01, 230; 709/227
See application file for complete search history.

(56) References Cited
U.S. PATENT DOCUMENTS 5,966,662 A * 10/1999 Murto .................. 455/458
6,081,592 A * 6/2000 Battle .................. 379/309
6,519,232 B1 * 2/2003 Becher ................. 370/314
7,221,753 B2 * 5/2007 Hutton et al. .......... 379/265.11
2001/0009014 A1 * 7/2001 Savage et al. ............ 709/204
2002/0080949 A1 * 6/2002 Mikhailov et al. ......... 379/230
2002/0118808 A1 * 8/2002 Kelleher et al. ........ 379/202.01
2004/0015405 A1 * 1/2004 Cloutier et al. ............ 705/26
2004/0028212 A1 * 2/2004 Lok et al. ............. 379/265.09
2005/0033684 A1 * 2/2005 Benedyk et al. ............ 705/39
2005/0143067 A1 * 6/2005 Van Do et al. ........... 455/432.3

OTHER PUBLICATIONS

TechWeb.com; "SIP", http://www.techweb.com/encyclopedia/defineterm?term=SIP&x=5&y=9; Aug. 22, 2003; pp. 1-3; CMP Media LLC, Seattle, WA, USA.
SearchNetworking.com; "Session Initiation Protocol", http://searchnetworking.techtarget.com; Aug. 6, 2003; pp. 1-2, TechTarget, Needham, MA, USA.
TechWeb.com; "nailed up", http://www.techweb.com/encyclopedia/defineterm?term=NAILEDUP&exact=1; Dec. 16, 2003; p. 1; CMP Media LLC, Seattle, WA, USA.
TechWeb.com; "SCP", http://www.techweb.com/encyclopedia/defineterm?term=SCP; Oct. 15, 2003; p. 1; CMP Media LLC, Seattle, WA, USA.

(Continued)

*Primary Examiner*—William J Deane
(74) *Attorney, Agent, or Firm*—Carmen Patti Law Group, LLC

(57) ABSTRACT

One or more application server components employ one or more data streams to provide to a telephony device on a remote network for a user one or more line-side services associated with a network address on a home network for the user.

35 Claims, 10 Drawing Sheets

OTHER PUBLICATIONS

Wikipedia.org; "Integrated services digital network", http://en.wikipedia.org/wiki/ISDN; Aug. 29, 2003; pp. 1-3; Wikimedia Foundation, Inc., FL, USA.

TechWeb.com; "CPE", http://www.techweb.com/encyclopedia/defineterm?term=CPE; Aug. 6, 2003; p. 1; CMP Media LLC, Seattle, WA, USA.

SearchNetworking.com; "Bearer Independent Call Control", http://searchnetworking.techtarget.com; Oct. 20, 2003; pp. 1-2; TechTarget, Needham, MA, USA.

Wikipedia.org; "Public switched telephone network", http://en.wikipedia.org/wiki/Public_switched_telephone_network; Aug. 29, 2003; pp. 1-2; Wikimedia Foundation, Inc., FL, USA.

TechWeb.com; "SS7", http://www.techweb.com/encyclopedia/defineterm?term=SS%37; Dec. 18, 2003; pp. 1-3; CMP Media LLC, Seattle, WA, USA.

Wikipedia.org; "Dual-tone multi-frequency", http://en.wikipedia.org/wiki/Dual-tone_multi-frequency; Aug. 29, 2003; pp. 1-2; Wikimedia Foundation, Inc., FL, USA.

TechWeb.com; "IN", http://www.techweb.com/encyclopedia/defineterm?term=IN; Dec. 18, 2003; p. 1; CMP Media LLC, Seattle, WA, USA.

TechWeb.com; "TCAP", http://www.techweb.com/encyclopedia/defineterm?term=TCAP; Dec. 18, 2003; p. 1; CMP Media LLC, Seattle, WA, USA.

* cited by examiner

APPLICATION SERVER COMPONENT (S) PROVIDING OF LINE-SIDE SERVICE(S) ASSOCIATED WITH NETWORK ADDRESS ON HOME NETWORK FOR USER TO TELEPHONY DEVICE ON REMOTE NETWORK FOR THE USER

CROSS-REFERENCE TO RELATED APPLICATIONS

This application contains subject matter that is related to the subject matter of the following applications, which are assigned to the same assignee as this application. The below-listed applications are hereby incorporated herein by reference in their entireties.

"DATA STREAM ASSOCIATION WITH CALL THROUGH EMPLOYMENT OF IDENTIFIER WITHIN MESSAGES ASSOCIATED WITH THE CALL," by Clark, et al., Ser. No. 10/698,573, filed Oct. 31, 2003.

"SERVICE(S) PROVIDED TO TELEPHONY DEVICE(S) THROUGH EMPLOYMENT OF DATA STREAM(S) ASSOCIATED WITH THE CALL," by Edward A. Clark, Ser. No. 10/698,327, filed Oct. 31, 2003.

"SERVICE(S) PROVIDED TO TELEPHONY DEVICE THROUGH EMPLOYMENT OF DATA STREAM(S) ASSOCIATED WITH CALL," by Edward A. Clark, Ser. No. 10/698,141, filed Oct. 31, 2003.

"TRANSMISSION OF USER INPUT(S) TO TELEPHONY DEVICE(S) THROUGH EMPLOYMENT OF DATA STREAM(S) ASSOCIATED WITH CALL," by Edward A. Clark, Ser. No. 10/698,328, filed Oct. 31, 2003.

TECHNICAL FIELD

The invention relates generally to telecommunications and more particularly to providing of line-side services to a telephony device on a network.

BACKGROUND

A user employs a telephony device on a home network to subscribe to one or more line-side services provided by the home network. Examples of the line-side services comprise a call waiting service, a call forwarding service, and/or a caller identification service. The telephony devices interact with the line-side services through employment of one or more connections, or local-loops, such as one or more twisted pair, coax, wireless, and/or fiber optic connections. Where the user employs a telephony device to initiate a call, the telephony device in one example employs the local-loop to interact with the line-side services provided by the home network.

Where a user employs a telephony device on a remote network for the user to initiate a call, the telephony device on the remote network in one example employs a local-loop of the remote network to interact with one or more line-side services provided by the remote network. However, the remote network may not provide the same line side services as the home network. As one shortcoming, a user employing a telephony device on a remote network for the user may receive different line-side services for calls initiated on the remote network. It is desirable for the user to interact with the same line-side services provided by the home network for the user regardless of the local-loop with which the telephony device interacts. As another shortcoming, networks that do not interact with telephony devices through local-loops, for example, Inter Exchange Carriers ("IXCs"), may not be able to provide line side services to the telephony device. The networks that do not interact with the telephony devices through local-loops are unable to potentially capture revenue from providing line-side services to the telephony devices. It is desirable for networks that do not interact with the telephony devices through the local-loops to provide line side services to potentially increase revenue and to provide additional services to users of the telephony devices.

Therefore, a need exists for a telephony device on a remote network for a user to interact with one or more line-side services provided by a home network for the user. A need also exists for providing of line-side services to a telephony device by a network that does not interact with the telephony device through a local-loop.

SUMMARY

The invention in one embodiment encompasses an apparatus. One or more application server components employ one or more data streams to provide to a telephony device on a remote network for a user one or more line-side services associated with a network address on a home network for the user.

Another embodiment of the invention encompasses a method. One or more line-side services associated with network address on a home network for the user are provided to a telephony device on a remote network for a user through employment of one or more data streams.

Yet another embodiment of the invention encompasses an article. The article comprises one or more computer-readable media. The article comprises means in the computer-readable medium for providing to a telephony device on a remote network for a user one or more line-side services associated with a network address on a home network for the user through employment of one or more data streams.

DESCRIPTION OF THE DRAWINGS

Features of exemplary implementations of the invention will become apparent from the description, the claims, and the accompanying drawings in which:

DETAILED DESCRIPTION

Figure 1:
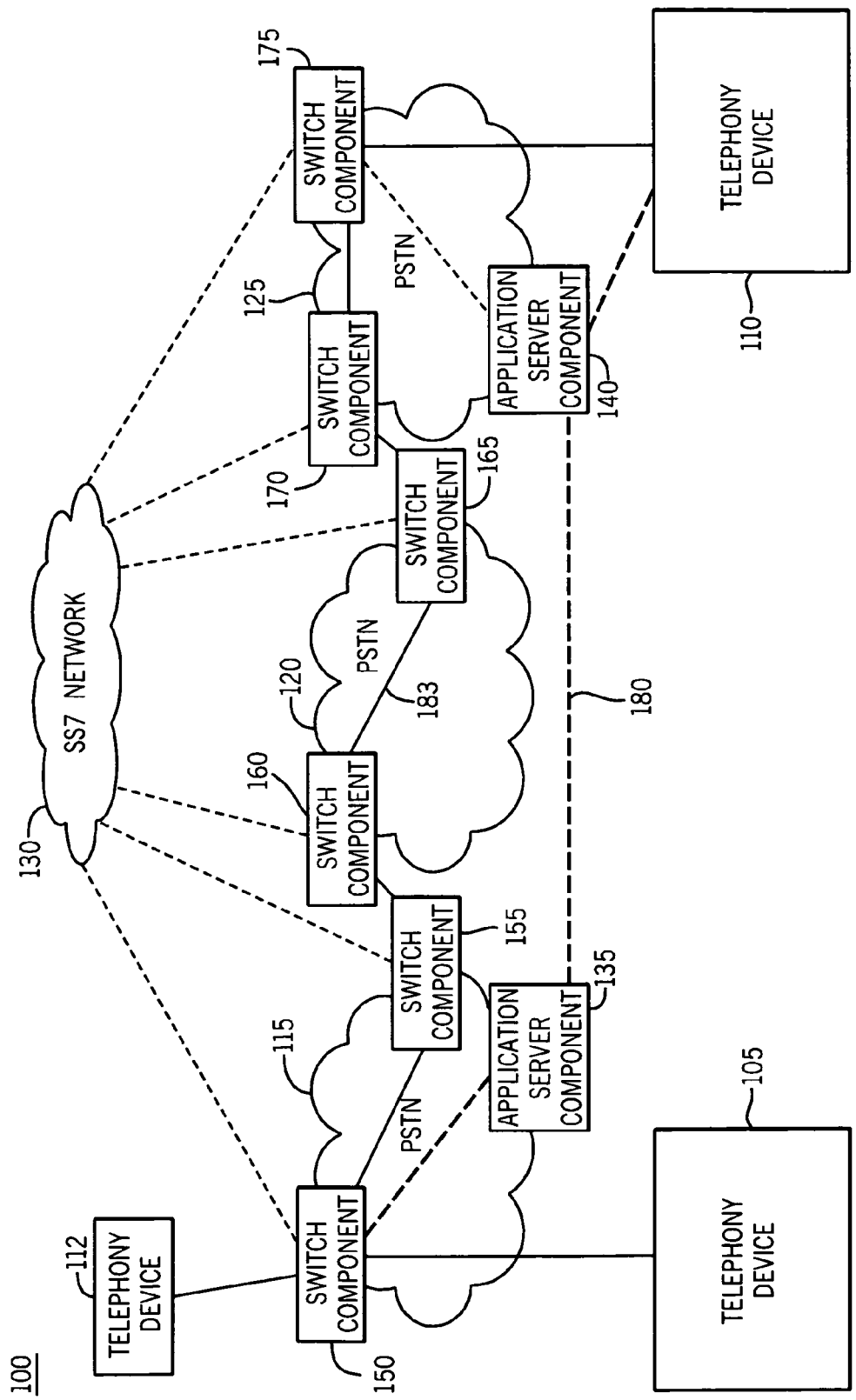
FIG. 1 is a representation of one exemplary implementation of an apparatus that comprises one or more telephony devices and one or more networks.

Turning to FIG. 1, an apparatus 100 in one example comprises one or more telephony devices 105, 110, and 112 and one or more networks 115, 120, 125, and 130. The telephony devices 105, 110, and/or 112 in one example comprise one or more Customer Premise Equipments ("CPEs"), for example, a computer, a web-enabled device, and a telephone. The telephony devices 105, 110, and/or 112 initiate one or more calls through employment of call request signaling. The call request signaling in one example comprises Dual-Tone Multi-Frequency ("DTMF" or Touch Tone) signaling, as will be understood by those skilled in the art. One or more users employ one or more of the telephony devices 105, 110, and/or 112 to initiate and/or receive one or more calls on the networks 115, 120, and/or 125. For example, a user employs the telephony device 110 to initiate a call to the telephony device 112.

The networks 115, 120, and 125 in one example comprise one or more networks owned and/or operated by one or more service providers. In one example, the networks 115, 120, and 125 comprise a Public Switched Telephony Network ("PSTN"). The network 130 in one example comprises a signaling network, for example, a Signaling System 7 ("SS7") network, as will be understood by those skilled in the art.

One or more of the networks 115, 120, 125, and 130 communicate with one or more other of the networks 115, 120, 125, and 130 through employment of one or more call control protocols. The one or more call control protocols in one example comprise one or more of an Integrated Services Digital Network User Part ("ISUP") protocol, a Session Initiation Protocol ("SIP"), a Bearer Independent Call Control ("BICC") protocol, and a Transaction Capabilities Application Part ("TCAP") protocol, as will be understood by those skilled in the art. The networks 115, 120, 125, and/or 130 in one example cooperate to establish calls between the telephony devices 105, 110, and/or 112.

The networks 115, 120, 125, and/or 130 cooperate to provide one or more services, for example, one or more line-side services, to the telephony devices 105, 110, and/or 112. The line-side services in one example comprise a call initiation service, a call termination service, a call waiting service, a call forwarding service, and/or a caller identification service. A user of the telephony device 105 on a home network for the user, for example, the network 115, subscribes to one or more of the line-side services provided by the network 115. The telephony devices 105, 110, and/or 112 interact with the line-side services in one example through employment of one or more local-loops associated with the networks 115 and 125. The local-loops in one example comprise one or more of a twisted pair, a coax cable, wireless, and a fiber optic connection. The networks 115 and 125 in one example comprise one or more application server components, for example, one or more application server components 135 and 140. The networks 115, 120, and 125 in one example comprise one or more switch components, for example, one or more switch components 150, 155, 160, 165, 170, and 175.

The application server components 135 and 140 in one example comprise one or application servers. One or more of the application server components 135 and 140 communicate through employment of one or more data stream control protocols. The data stream control protocols in one example comprise one or more of a User Datagram Protocol ("UDP"), a Transfer Control Protocol ("TCP"), and a Session Initiation Protocol ("SIP").

The application server components 135 and/or 140 and the switch components 150, 155, 160, 165, 170, and/or 175 in one example communicate through employment of one or more service control protocols. The service control protocols in one example comprise the Session Initiation Protocol ("SIP"), the Signaling Connection Control Point ("SCCP") protocol, and/or the Integrated Services Digital Network User Part ("ISUP") protocol. One or more of the application server components 135 and 140 and/or one or more of the switch components 150, 155, 160, 165, 170, and 175 employ one or more of the service control protocols to communicate call or session events, status information, and/or session action requests, to/from one or more of the application server components 135 and/or 140 and/or the switch components 150, 155, 160, 165, 170, and/or 175.

The switch components 150, 155, 170, and/or 175 in one example comprise one or more telephony switches, for example, one or more Service Switching Points ("SSPs"). The switch components 150 and/or 175 in one example communicate with the telephony devices 105, 110, and/or 112 through employment of a call request signaling. The switch components 150, 155, 160, 165, 170, and/or 175 and the telephony devices 105, 110, and /or 112 in one example cooperate to establish one or more calls. The switch component 150 in one example employs a local-loop to communicate with the telephony device 105. The switch component 175 in one example employs a local-loop to communicate with the telephony device 110. The switch components 150 and/or 175 communicate with one or more other of the switch components 150, 155, 160, 165, 170, and 175 through employment of one or more of the one or more call control protocols.

The application server components 135 and/or 140 and the switch components 150, 155, 160, 165, 170, and/or 175 cooperate to provide one or more line-side services to users of the telephony devices 105, 110, and/or 112. The application server components 135 and/or 140 and the switch components 150, 155, 160, 165, 170, and/or 175 comprise user data associated with one or more line-side services subscribed to by one or more user of the telephony devices 105, 110, and/or 112. The application server components 135 and/or 140 and the switch components 150, 155, 160, 165, 170, and/or 175 in one example employ one or more network addresses, for example, telephony numbers and/or SIP Universal Resource Identifiers ("URIs", for example, Universal Resource Locators ("URLs") for example, an email address or website), associated with the telephony devices 105, 110, and/or 112 to determine one or more line-side services subscribed to by the users of the telephony devices 105, 110, and/or 112.

The application server components 135 and/or 140 and the telephony devices 105, 110, and/or 112 in one example cooperate to establish one or more web portals. For example, the application server components 134 and/or 140 comprise one or more web portal servers and the telephony device 105, 110, and/or 112 comprise one or more web portal clients for one or more line-side services to the telephony device 105 and/or 110. For example, the application server component 140 provides a web portal server for one or more service events and/or signals to a user of the telephony device 110. The one or more service events in one example comprise one or more of: a call initiation event, a call termination event, or a feature invocation/notification event such as a conference call invocation event, a call forwarding activation event, or a speed-dial change event. The application server components 135 and/or 140 provide one or more interfaces to one or more users of the telephony devices 105, 110, and/or 112, for example, a user of the telephony device 110 through employment of one or more web portals.

The application server components 135 and/or 140 (i.e., the web portal servers) cooperate to provide data to the telephony devices 105, 110, and/or 112 (i.e., the web portal clients). The interfaces in one example comprises one or more eXtended Markup Language ("XML") interfaces. The application server components 135 and/or 140 employ one or more internet protocols, for example, a HyperText Transfer Protocol ("HTTP"), to provide the interfaces to the telephony devices 105, 110, and/or 112. The user of the telephony device 110 initiates one or more user inputs and/or receives one or more service events and/or signals through employment of the interface. The application server components 135 and/or 140 in one example provide a control interface, for example, a web portal control interface, to the telephony devices 105 and/or 110. A user of the telephony device 110 in one example employs the control interface to remotely interact with one or more line-side services associated with the telephony device 105 on the network 115. For example, the user of the telephony device 110 employs the web portal control interface to initiate a call, for example, a remote call, to the telephony device 112 through one or more line-side services of the home network for the user of the telephony device 105 (e.g., the network 115).

The application server components 135 and/or 140 and the switch components 150, 155, 160, 165, 170, and/or 175 cooperate in one example to establish one or more data streams, for example, a data stream 180, between the application server components 135 and 140. A description of operation of the application server components 135 and 140, the switch components 150, 155, 160, 165, 170, and 175 in conjunction with the data stream 180 is presented herein, with further details provided in the above-incorporated application Ser. No. 10/698,573. For example, the switch component 150 inserts an identifier associated with the application server component 135 within a message associated with an establishment of a call or an invocation of a service, for example, an invocation of a conference call service. The switch component 150 sends the message to the switch component 175. Upon receipt of the message, the switch component 175 provides the identifier from within the message to the application server component 140. The application server component 140 employs the identifier to establish the data stream 180 with the application server component 135. The application server components 135 and/or 140 and the switch components 150, 155, 160, 165, 170, and 175 employ the identifier to uniquely identify a call and an associated data stream.

The application server components 135 and/or 140 in one example employ the data stream 180 as a virtual signaling path to provide for a remote interaction between the user of the telephony device and the one or more line-side services. For example, the application server components 135 and/or 140 cooperate to establish a virtual local loop for a user of the telephony device 110 to provide one or more line-side services to the user of the telephony device 110 at a remote location. The application server components 135 and/or 140 employ the virtual signaling path, for example, the data stream 180, to provide access to and/or perform one or more of the line-side services for the user of the telephony device 110 based on the one or more user inputs and/or the one or more service events and/or signals. For example, the application server components 135 and/or 140 connect the telephony device 110 hosted by a remote network, for example, the network 125, with one or more line-side services provided by a home network, for example, the network 115, for a user of the telephony device 110. The application server components 135 and/or 140 in one example employ the data stream 180 as a virtual signaling path associated with a user of a telephony device, for example, the telephony device 110.

The application server components 135 and/or 140 employ the data stream 180 to register a user of the telephony device 110 on a home network for the user and/or a remote network for the user. In one example, when a user employs a telephony device hosted by a remote network, for example, the telephony device 110 on the network 125, the user registers with the remote network (e.g., the network 125). The user of the telephony device 110 dials into the application server component 140 on the network 125 and provides a network address associated with the telephony device 110. In another example, the application server components 135 and/or 140 cooperate through employment of the data stream 180 to register the telephony device 110 hosted by a home network for a user of the telephony device 110, for example, the network 115. The user of the telephony device 110 in one example employs an interface to provide a network address associated with the telephony device 105 hosted by the home network for the user (e.g., the network 105). The application server component 140 employs the data stream 180 to provide the network address associated with the telephony device 105 to the application server component 135 on the home network, the network 115. The application server component 135 employs the network address to register the user of the telephony device 110 hosted by the remote network, the network 125, on the home network, the network 115, as will be appreciated by those skilled in the art. The application server component 135 employs the data stream 180 to provide one or more service events, for example, a registration complete event, to the application server component 140.

The application server components 135 and/or 140 and the switch components 150, 155, 160, 165, 170, and/or 175 cooperate to establish the virtual bearer path 183. The application server component 135 in one example instructs the switch component 150 to initiate a call to a network address. The application server component 135 and the switch component 150 cooperate to insert an identifier into a message to initiate the call. The identifier in one example comprises an identifier associated with the data stream 180. The application server component 135 informs the application server component 140 through employment of the data stream 180 (e.g., the virtual signaling path) to establish the call associated with the identifier as a virtual bearer path, for example, the virtual bearer path 183. The application server component 140 instructs the switch component 175 to establish the call as the virtual bearer path 183. The switch components 150, 155, 160, 165, 170, and/or 175 in one example establish the call with the telephony device 110 and place the call on hold, forming the virtual bearer path 183.

A network address in one example comprises a telephony number or a SIP Universal Resource Indicator ("URI"), for example, an email address or a website. The application server components 135 and/or 140 and the switch components 150, 155, 160, 165, 170, and/or 175 employ a network address to determine one or more of the one or more line-side services associated with a user of the telephony device 105, 110, and/or 112. In one example, the network address is associated with the telephony device 105 hosted by a home network for the user of the telephony device 110, for example, the network 115. In another example, the network address is associated with a network 120, for example an Inter Exchange Carrier ("IXC"). The network 120 in one example provides one or more line-side services through employment of the data stream 180 and the virtual bearer path 183.

The application server components 135 and/or 140 and the switch components 150, 155, 160, 165, 170, and/or 175 cooperate to establish the virtual bearer path 183 for a duration of time. In one example, the application server components 135 and/or 140 and the switch components 150, 155, 160, 165, 170, and/or 175 establish the virtual bearer path 183 for a call. In another example, the application server components 135 and/or 140 and the switch components 150, 155, 160, 165, 170, and/or 175 establish the virtual bearer path 183 for multiple calls. In yet another example, the application server components 135 and/or 140 and the switch components 150, 155, 160, 165, 170, and/or 175 are pre-provisioned to teardown the virtual bearer path 183 after a predefined duration of time or condition. In yet still another example, the application server components 135 and/or 140 and the switch components 150, 155, 160, 165, 170, and/or 175 tear-down the virtual bearer path 183 upon request from a user of the telephony device 110.

In one example, where a user of the telephony device 110 is billed by the minute for use of a phone line, the application server components 135 and/or 140 and the switch components 150, 155, 160, 165, 170, and/or 175 establish the virtual bearer path 183 for a duration of a time for a call and tear down the virtual bearer path 183 after the duration of time for the call. In another example, where a user of the telephony device 110 is billed on a fixed-rate for use of a phone line, the application server components 135 and/or 140 and the switch components 150, 155, 160, 165, 170, and/or 175 establish the virtual bearer path 183 in the morning, for example, for multiple calls and tear down the virtual bearer path 183 upon request from the user of the telephony device 110. In yet another example, the application server components 135 and/or 140 and the switch components 150, 155, 160, 165, 170, and/or 175 tear-down the virtual bearer path 183 if a subsequent call is not placed within 5 minutes after termination of a previous call.

The application server components 135 and/or 140 and the switch components 150, 155, 160, 165, 170, and/or 175 employ the virtual bearer path 183 to provide one or more line-side services. In one example, a user of the telephony device 110 employs one or more line-side services associated with the telephony device 105 to initiate a remote call to the telephony device 112. The application server components 135 and/or 140 and the switch components 150, 155, 160, 165, 170, and/or 175 employ the virtual bearer path 183 to connect the telephony device 110 on a remote network for the user of the telephony device 110 to the remote call originating from the telephony device 105. In another example, a user of the telephony device 110 receives, through employment of one or more line-side services, an incoming call destined for the telephony device 105 hosted by a home network for the user of the telephony device 110. The application server components 135 and/or 140 and the switch components 150, 155, 160, 165, 170, and/or 175 employ the virtual bearer path 183 to connect the telephony device 110 on a remote network for the user of the telephony device 110 to the incoming call destined for the telephony device 105 on the home network for the user of the telephony device 110.

An illustrative description of exemplary operation of the apparatus 100 is presented, for explanatory purposes.

Figure 2:
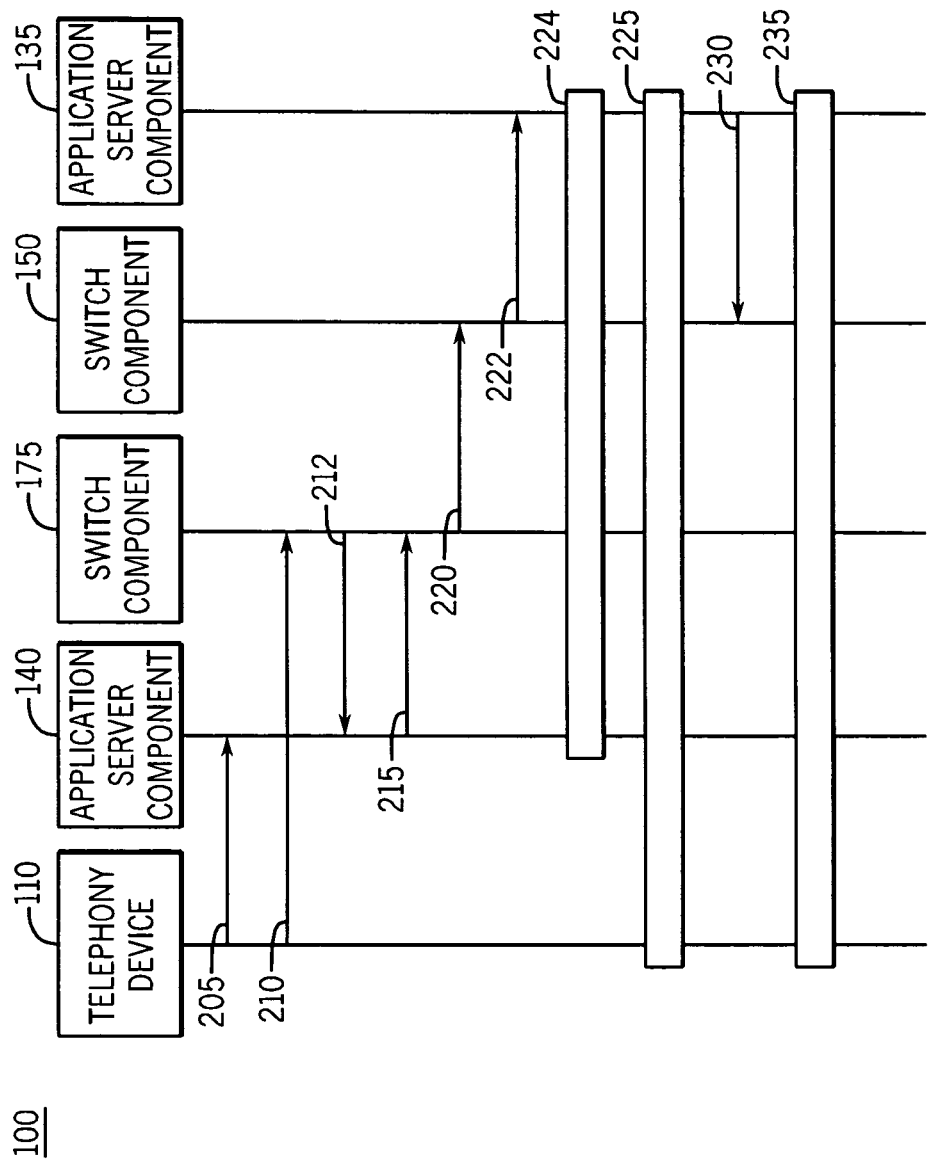
FIG. 2 is a representation of an exemplary process flow of an establishment of a virtual bearer path between a telephony device on a remote network and a home network of the apparatus of FIG. 1.

Turning to FIG. 2, a user establishes a virtual local loop through employment of the virtual signaling path 180 to access one or more line-side services subscribed to by the network address associated with the telephony device 105 provided by a home network, the network 115. The user travels to a remote network, for example, the network 125. The user employs the telephony device 110 to establish a virtual signaling path, for example, the data stream 180, and the virtual bearer path 183 to interact with the one or more line-side services provided by the network 115. In STEP 205, the user of the telephony device 110 initiates a call to the application server component 140 on the network 125, to register on the network 125. The user of the telephony device 110 provides a number associated with the telephony device 110.

In STEP 210, the switch component 175 on the network 125 receives a call request from the telephony device 110 destined for the switch component 150. In STEP 212, the switch component 175 communicates with the application server component 140 to obtain an identifier. In STEP 215, the application server component 140 instructs the switch component 175 to insert the identifier into a message associated with the call and to initiate the call to the switch component 150.

In STEP 220, the switch component 175 initiates the call to the switch component 150 on the network 115. The switch components 175 and 150 establish a bearer path associated with the call. In STEP 222, the switch component 150 informs the application server component 135 on the network 115 of the incoming call and provides the identifier to the application server component 135. In STEP 224, the application server component 135 employs the identifier to establish the virtual signaling path, for example, the data stream 180, with the application server component 140. In STEP 225, the application server components 135 and 140 cooperate through employment of the data stream 180 to register the user of the telephony device 110 on the network 115.

In STEP 230, the application server component 135 informs the switch component 150 to establish the bearer path as the virtual bearer path 183. The switch component 150 associates the virtual bearer path 183 with the one or more line-side services subscribed to by the user of the telephony device 110. In STEP 235, the application server components 135 and 140 employ the data stream 180 to provide for an interaction between the user of the telephony device 110 and the line-side services.

Figure 3:
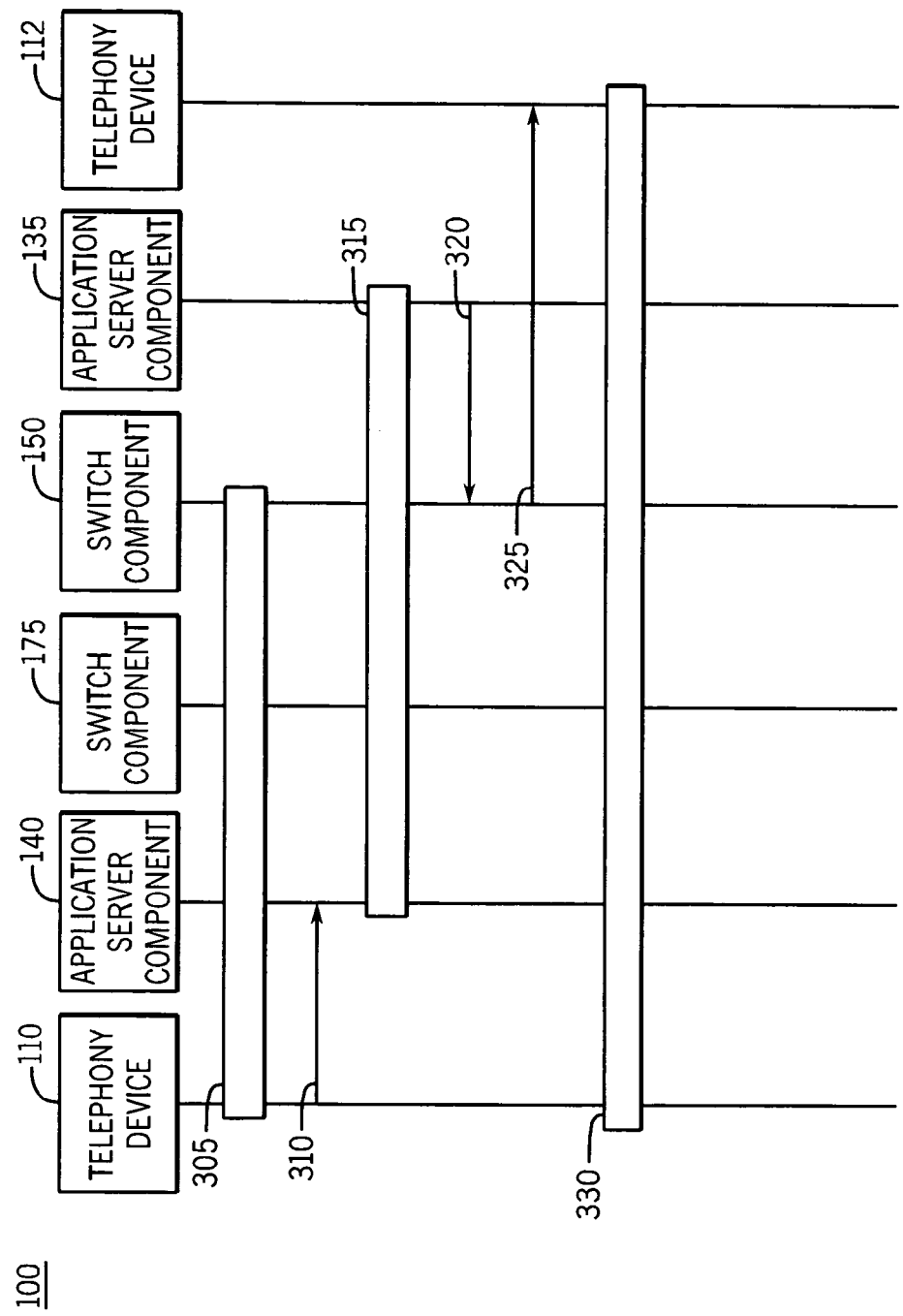
FIG. 3 is a representation of an exemplary process flow of a remote call initiated by the telephony device on the remote network of the apparatus of FIG. 1.

Turning to FIG. 3, a user subscribes the network address associated with telephony device 105 to one or more line-side services provided by a home network, for example, the network 115. The user travels to a remote network, for example, the network 125. The user employs the telephony device 110 to establish a virtual signaling path, for example, the data stream 180, and the virtual bearer path 183 to initiate a remote call to the telephony device 112 from the telephony device 105.

In STEP 305, the application server component 140 and the switch component 175 determine that the virtual bearer path 183 and a virtual signaling path, the data stream 180, are not already established for the user. The application server component 140 and the switch component 175 establish the virtual bearer path 183 and the data stream 180 as in STEPS 205-235 of FIG. 2. In STEP 310, the application server component 140 receives a service event, for example, a call initiation event, from the user of the telephony device 110 that contains a request to initiate a remote call to the user of the telephony device 112 from the telephony device 105. The request to initiate the remote call to the user of the telephony device 112 comprises a network address, such as a called party number, associated with the telephony device 112. In STEP 315, the application server component 140 employs the data stream 180 to communicate the service event to the application server component 135.

In STEP 320, the application server component 135 provides the called party number associated with the telephony device 112 to the switch component 150. The application server component 135 instructs the switch component 150 to initiate the call to the telephony device 112. In STEP 325, the switch component 150 initiates the call to the telephony device 112. In STEP 330, the switch component 150 connects the virtual bearer path 183 between the telephony device 110 and the switch component 150 to the call established between the telephony device 112 and the switch component 150.

Figure 4:
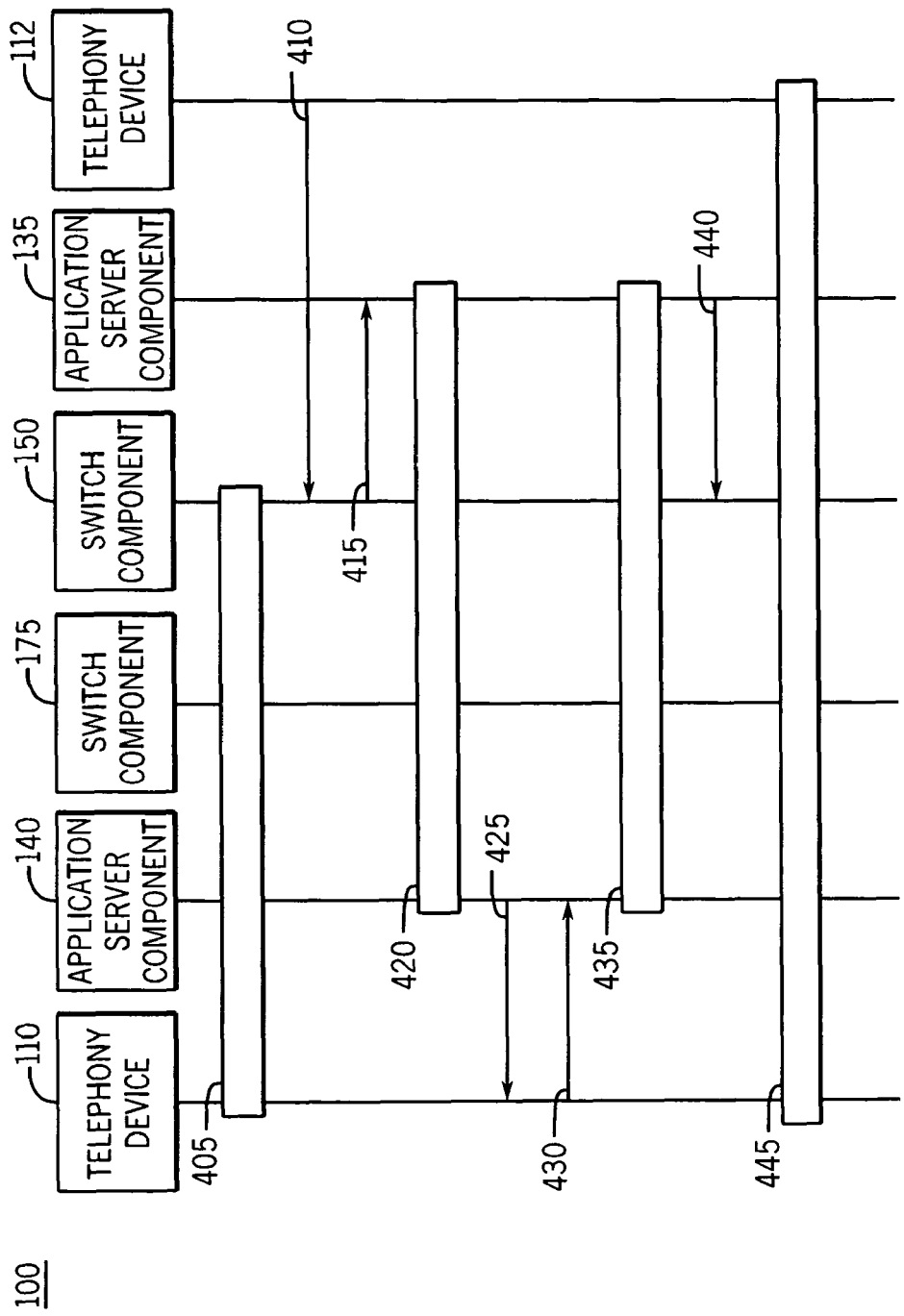
FIG. 4 is a representation of an exemplary process flow of an incoming call destined for a telephony device on a home network of the apparatus of FIG. 1.

Turning to FIG. 4, a user subscribes a network address associated with the telephony device 105 to one or more line-side services provided by a home network, the network 115. The user travels to a remote network, for example, the network 125. The user employs the telephony device 110 to establish a virtual signaling path, for example, the data stream 180, and the virtual bearer path 183 to receive an incoming call destined for the telephony device 105. In STEP 405, the application server component 140 and the switch component 175 determine that the virtual bearer path 183 and a virtual signaling path (e.g., the data stream 180) are not already established for the user. The application server component 140 on the network 125 and the switch component 175 on the network 125 establish the virtual bearer path 183 and the data stream 180 with the switch component 150 on the network 115 and the application server component 135 on the network 115 as in STEPS 205-235 of FIG. 2.

In STEP 410, a user of the telephony device 112 dials a number, for example, a called party number, of the telephony device 105. The switch component 150 employs the called party number to associate the incoming call with the telephony device 105. In STEP 415, the switch component 150 identifies the telephony device 105 as subscribed to a virtual loop service and the switch component 105 communicates with the application server component 135. In STEP 420, the application server component 135 employs the data stream 180 associated with the user of the telephony device 110 to inform the application server component 140 of a service event, for example, a call termination event, destined for the telephony device 105.

In STEP 425, the application server component 140 employs a web portal to alert the user of the telephony device 110 to the service event. In STEP 430, the user of the telephony device 110 accepts the service event. In STEP 435, the application server component 140 employs the data stream 180 to signal to the application server component 135 that the user of the telephony device 110 accepts the service event. In STEP 440, the application server component 135 communicates with the switch component 150 to connect the incoming call to the virtual bearer path 183. In STEP 445, the switch component 150 connects the virtual bearer path 183 established between the telephony device 110 and the switch component 150 to the incoming call established between the switch component 150 and the telephony device 112.

Figure 5:
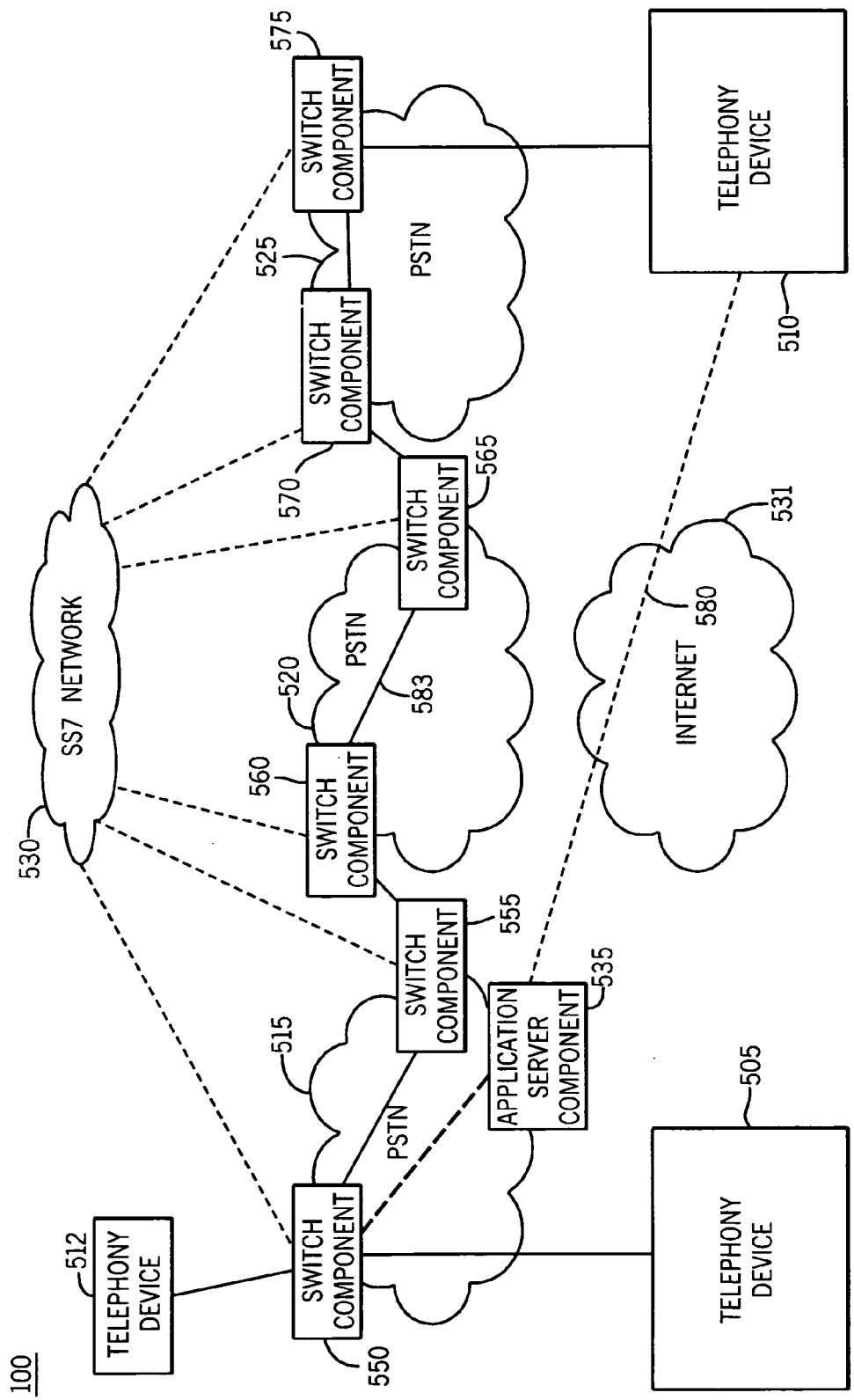
FIG. 5 is a representation of another exemplary implementation of the apparatus of FIG. 1.

Turning to FIG. 5, the apparatus 100 in one example comprises one or more telephony devices 505, 510, and 512, and one or more networks 515, 520, 525, 530, and 531. The network 515 in one example comprises an application server component 535. The network 531 in one example comprises a packet network, for example, the public Internet. The networks 520 and 530 are similar to networks 120 and 130 of FIG. 1. The network 525 in one example omits an application server component.

A user of the telephony device 510 on a remote network for the user of the telephony device 510, for example, the network 525, accesses the application server component 535 through employment of the network 531 (e.g., the public Internet). For example, the user of the telephony device 510 employs a network address to access the application server component 535 and to register on the network 115. The telephony device 510 and the application server component 535 cooperate to establish the data stream 580 through employment of one or more of the data stream control protocols, such as TCP/IP.

Figure 6:
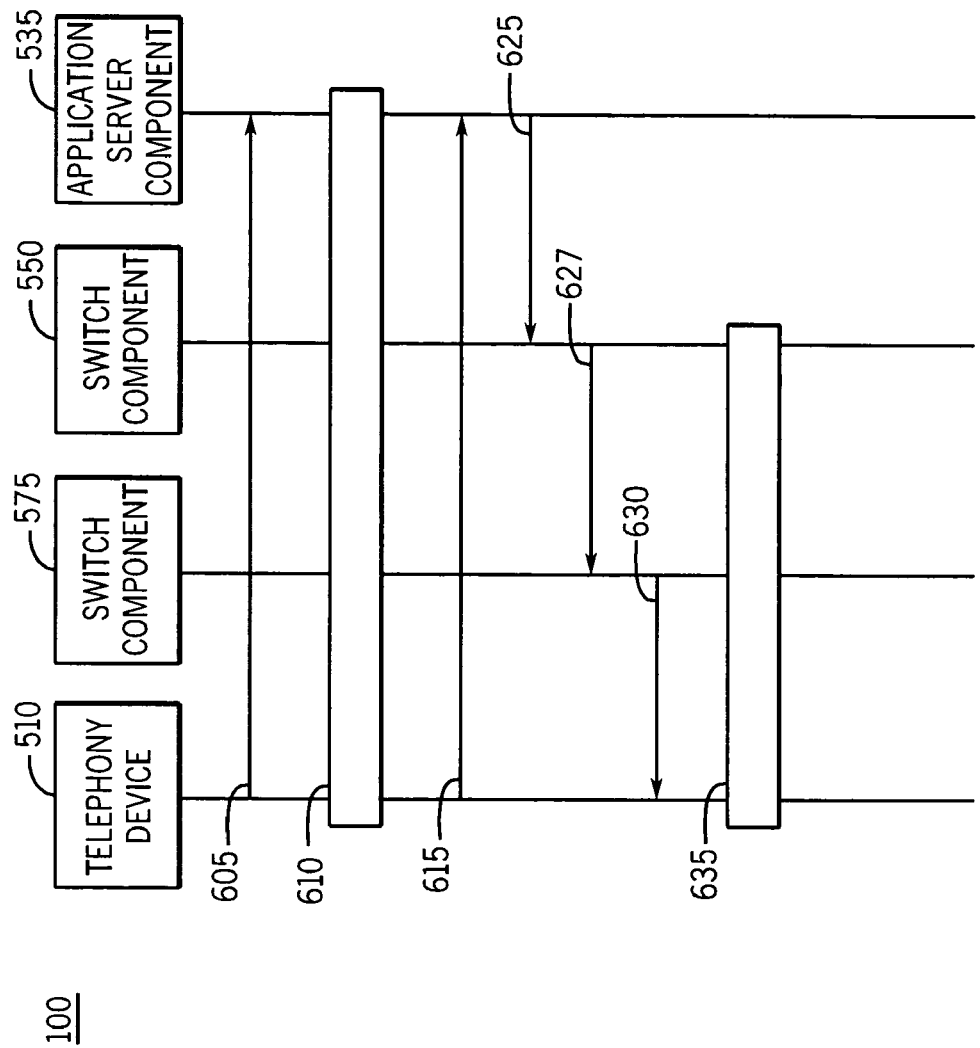
FIG. 6 is a representation of an exemplary process flow of an establishment of a virtual bearer path between a telephony device on a remote network and a home network of the apparatus of FIG. 5.

Turning to FIG. 6, a user subscribes a network address associated with the telephony device 505 to one or more line-side services provided by a home network, the network 515. The user travels to a remote network, for example, the network 525. The user employs the telephony device 510 to establish a virtual signaling path, for example, the data stream 580, and the virtual bearer path 583 to interact with the one or more line-side services provided by the network 515.

In STEP 605, the user of the telephony device 510 communicates with the application server component 535 over the network 531 to establish a virtual signaling path, for example, the data stream 580. In STEP 610, the user of the telephony device 510 provides a network address, for example, a telephony number of the telephony device 510, to the application server component 535. The application server component 135 provides the telephony number to the switch component 550 to establish the virtual bearer path 583. In STEP 615, the user of the telephony device 510 employs the virtual signaling path, the data stream 580, to initiate an event, for example, a call initiation event, to initiate a call to establish the virtual bearer path 583 with the application server component 535. In STEP 625, the application server component 535 communicates with the switch component 550 on the home network, (e.g., the network 515) to establish the virtual bearer path 583 with the telephony device 110 for the call. In STEP 627, the switch component 550 routes a call to the switch component 575. In STEP 630, the switch component 575 routes the call to the telephony device 510. In STEP 635, the user of the telephony device 510 answers the call and the switch component 550 marks the virtual bearer path 583 as established.

Figure 7:
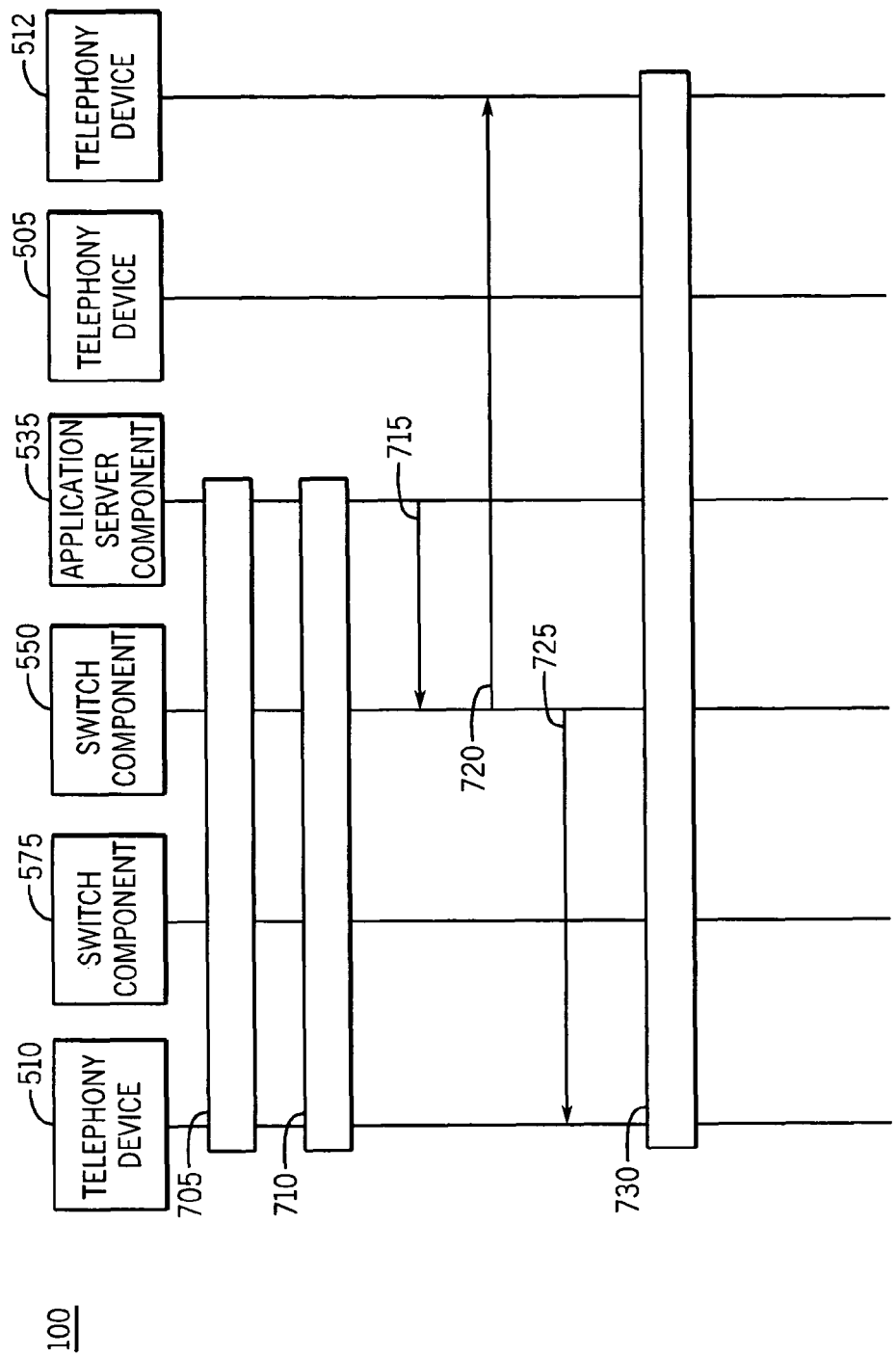
FIG. 7 is a representation of an exemplary process flow of a remote call initiation by a telephony device on a remote network of the apparatus of FIG. 5.

Turning to FIG. 7, a user subscribes a network address associated with the telephony device 505 to one or more line-side services for the telephony device 505 provided by a home network, the network 515. The user travels to a remote network, for example, the network 525. The user employs the telephony device 510 to establish a virtual signaling path, for example, the data stream 580, and the virtual bearer path 583 to initiate a remote call to the telephony device 512. The telephony device 510 and the application server component 535 cooperate to establish the data stream 580 as in FIG. 5.

In STEP 705, the user of the telephony device 510 registers with the application server component 535 through employment of the data stream 580. The user of the telephony device 510 registers on the network 525 by providing a network address, for example, a telephony number of the telephony device 505, to the application server component 535. The application server component 535 employs the telephony number 505 to determine the one or more line-side services subscribed to by the user of telephony device 505.

In STEP 710, the application server component 535 receives through employment of the data stream 580, a call origination event from the user of the telephony device 510 that comprises a request to initiate the remote call to the telephony device 512. In STEP 715, the application server component 535 communicates with the switch component 550 to initiate the remote call to the telephony device 512 and to establish the virtual bearer path 583 with the telephony device 510. In STEP 720, the switch component 550 initiates the remote call to the telephony device 512. The switch component 550 provides a calling party number associated with the telephony device 505 on the network 515. The user of the telephony device 512 answers the call.

In STEP 725, the switch component 550 initiates a call to the telephony device 510 to establish the virtual bearer path 583 for the remote call to the telephony device 512 as in STEPS 627-635 of FIG. 6. In STEP 730, the switch component 550 cooperates to connect the remote call between the switch component 550 and the telephony device 512 to the virtual bearer path 583 between the telephony device 510 and the switch component 550. Upon termination of the remote call, the switch components 550 and 575 tear-down the virtual bearer path 583 between the telephony device 510 and the telephony device 512.

Figure 8:
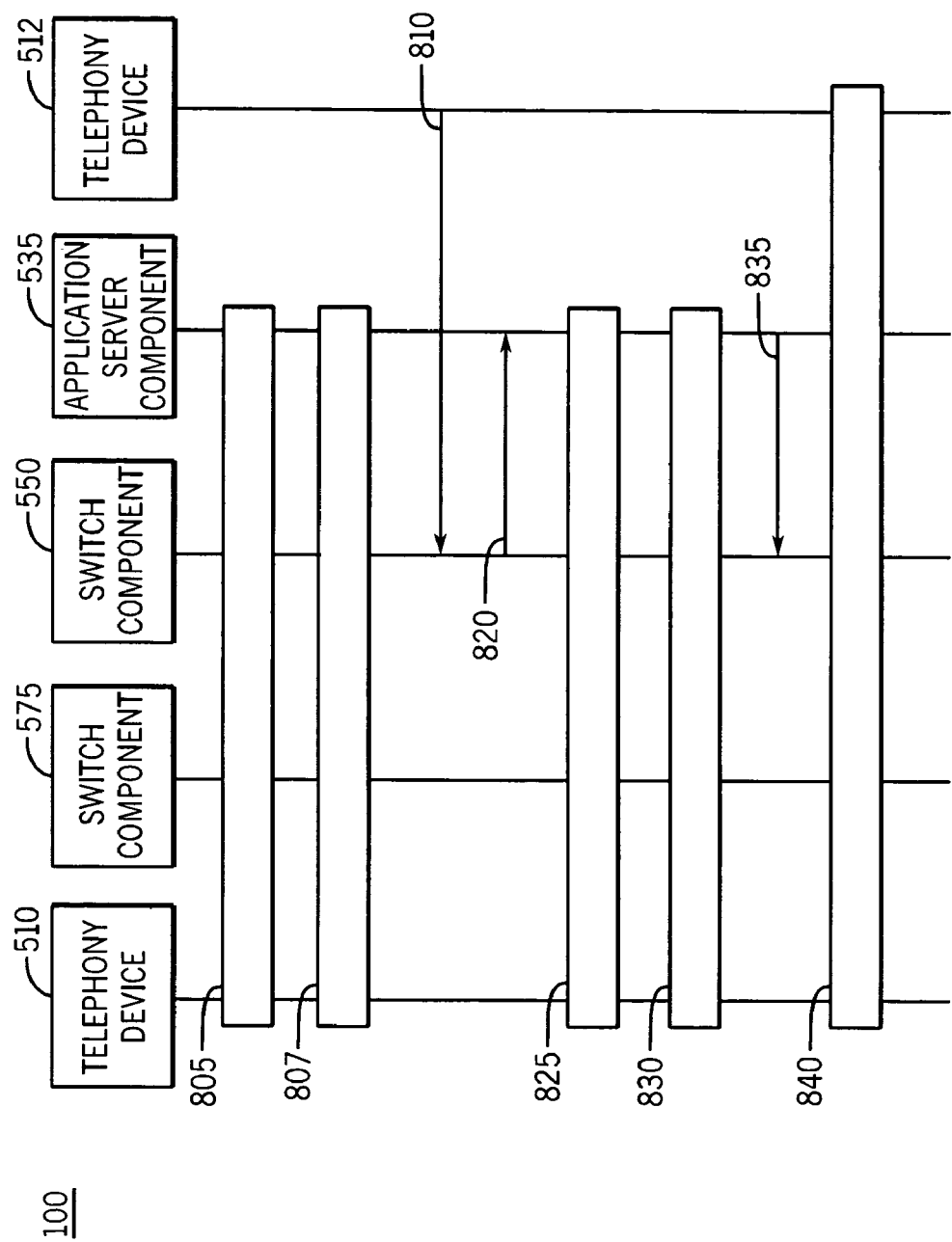
FIG. 8 is a representation of an exemplary process flow of an incoming call destined for a telephony device on a home network of the apparatus of FIG. 5.

Turning to FIG. 8, a user subscribes a network address associated with the telephony device 505 to one or more line-side services for the telephony device 505 provided by a home network, the network 515. The user travels to a remote network, for example, the network 525. The user employs the telephony device 510 to establish a virtual signaling path, for example, the data stream 580, and the virtual bearer path 583 to receive an incoming call destined for the telephony device 505. In STEP 805, the application server component 535 and the switch component 575 establish the virtual bearer path 583 and a virtual signaling path, for example, the data stream 580, with the telephony device 510, as is similar to the STEPS of FIGS. 4 and 6.

In STEP 807, the user of the telephony device 510 registers with the application server component 535 through employment of the data stream 580. The user of the telephony device 510 provides to the application server component 535, a remote number of the telephony device 510. The application server component 535 associates the remote number with one or more line-side services subscribed to by the telephony device 510. In STEP 810, the user of the telephony device 512 initiates the incoming call to the telephony device 505. In STEP 815, the switch component 550 employs a called party number of the incoming call to associate the incoming call with the telephony device 505. The switch component 550 employs the called party number to associate the telephony device 505 with a virtual loop service. In STEP 820, the switch component 550 informs the application server component 535 of the incoming call destined for the telephony device 505. The switch component 550 provides the calling party number and the called party number of the incoming call to the application server component 535.

In STEP 825, the application server component 535 associates the called party number of the call with the user of the telephony device 510. The application server component 535 employs the data stream 580 to provide a calling party number of the telephony device 112 and the called party number to the user at the telephony device 510. In STEP 830, the application server component 535 receives a request from the user of the telephony device 510 to accept the incoming call. In STEP 835, the application server component 535 instructs the switch component 550 to establish the virtual bearer path 583 with the telephony device 510, as in STEPS 625-636 of FIG. 6. In STEP 840, the switch components 550 and 575 cooperate to connect the incoming call between the telephony device 512 and the switch component 550 with the virtual bearer path 583 between the telephony device 510 and the switch component 550.

Figure 9:
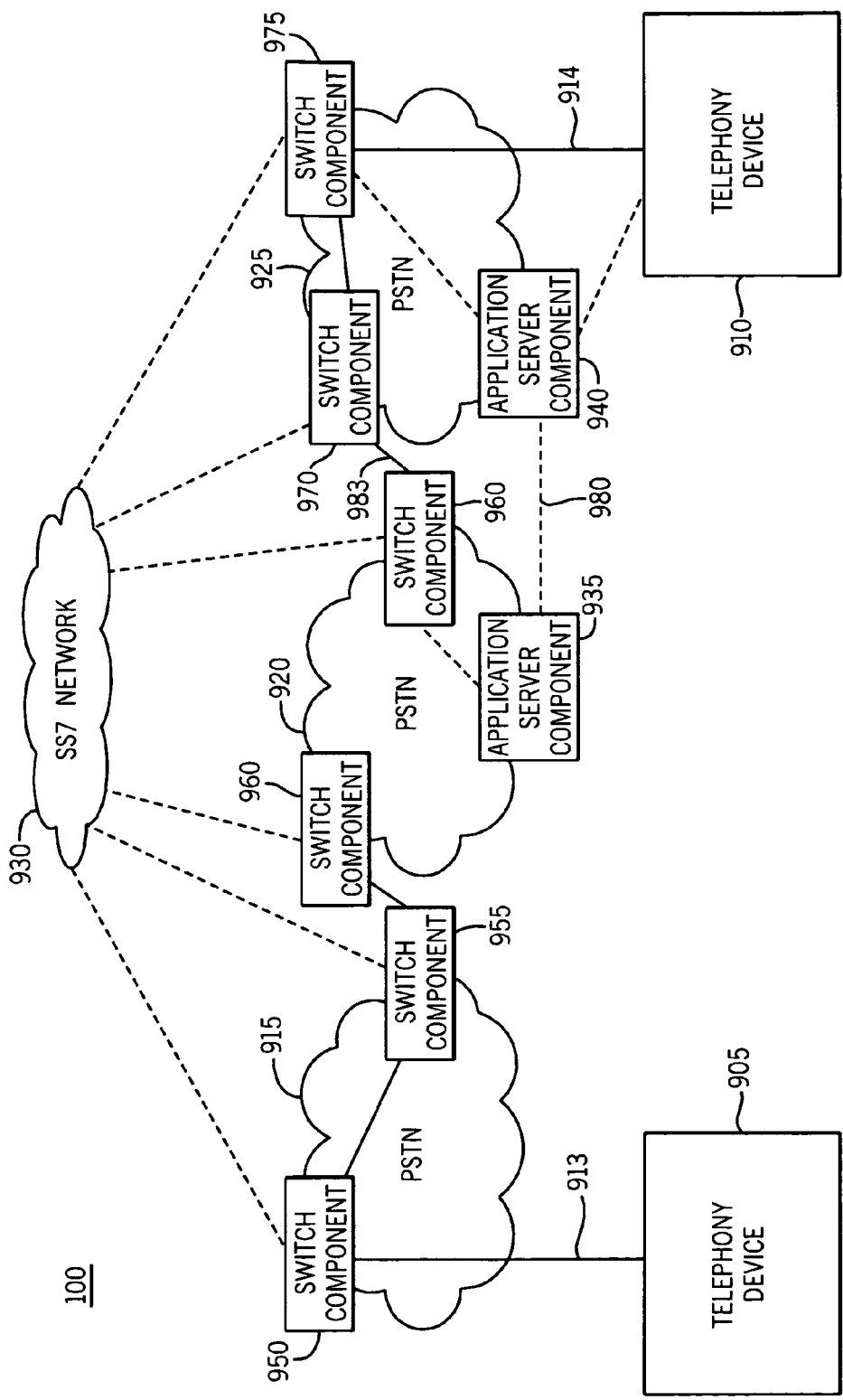
FIG. 9 is a representation of another exemplary implementation of the apparatus of FIG. 1.

Turning to FIG. 9, the apparatus 100 in one example comprises one or more telephony devices 905 and 910, and one or more networks 915, 920, 925, and 930. The network 920 provides one or more line-side services associated with one or more network addresses to one or more users of the telephony device 905 and 910. The network 920 comprises an application server component 935. The network 925 comprises an application server component 940. A remote telephony device, for example, the telephony device 910, interacts with the line-side services through employment of one or more virtual signaling paths, for example, a data stream 980, between the application server component 935 and the application server component in the remote network 940. The telephony device 905 and 910 in one example do not communicate with the network 920 through employment of one or more local-loops, as in the telephony devices 105 and 110 of FIG. 1.

Referring to FIGS. 1-4 and 9, the network 920 associates one or more line-side services with a user of the telephony device 910 through employment of one or more network addresses. For example, a user of the telephony device 910 employs a network address to register on the network 920 and to establish a virtual signaling path, for example, the data stream 980. The user of the telephony device 910 employs the data stream 980 to establish the virtual bearer path 983 between the network 920 and the telephony device 910, as is similar to FIGS. 1-2. The user of the telephony device 910 interacts with the one or more line-side services provided by the network 920 as is similar to the interaction between the user of the telephony device 110 with the application server component 135 in FIGS. 1-4.

For example, the telephony device 910 registers with a remote network, the network 925. The application server component 940 establishes the data stream 980 with the application server component 935. The application server components 935 and 940 cooperate to establish the virtual bearer path 983 between a switch component 960 on the network 920 and a switch component 975 on the network 925. The user of the telephony device 910 employs the data stream 980 to interact with the one or more line-side services provided by the network 920, for example, a call initiation service, to initiate a call from the network 920 to the telephony device 905.

Figure 10:
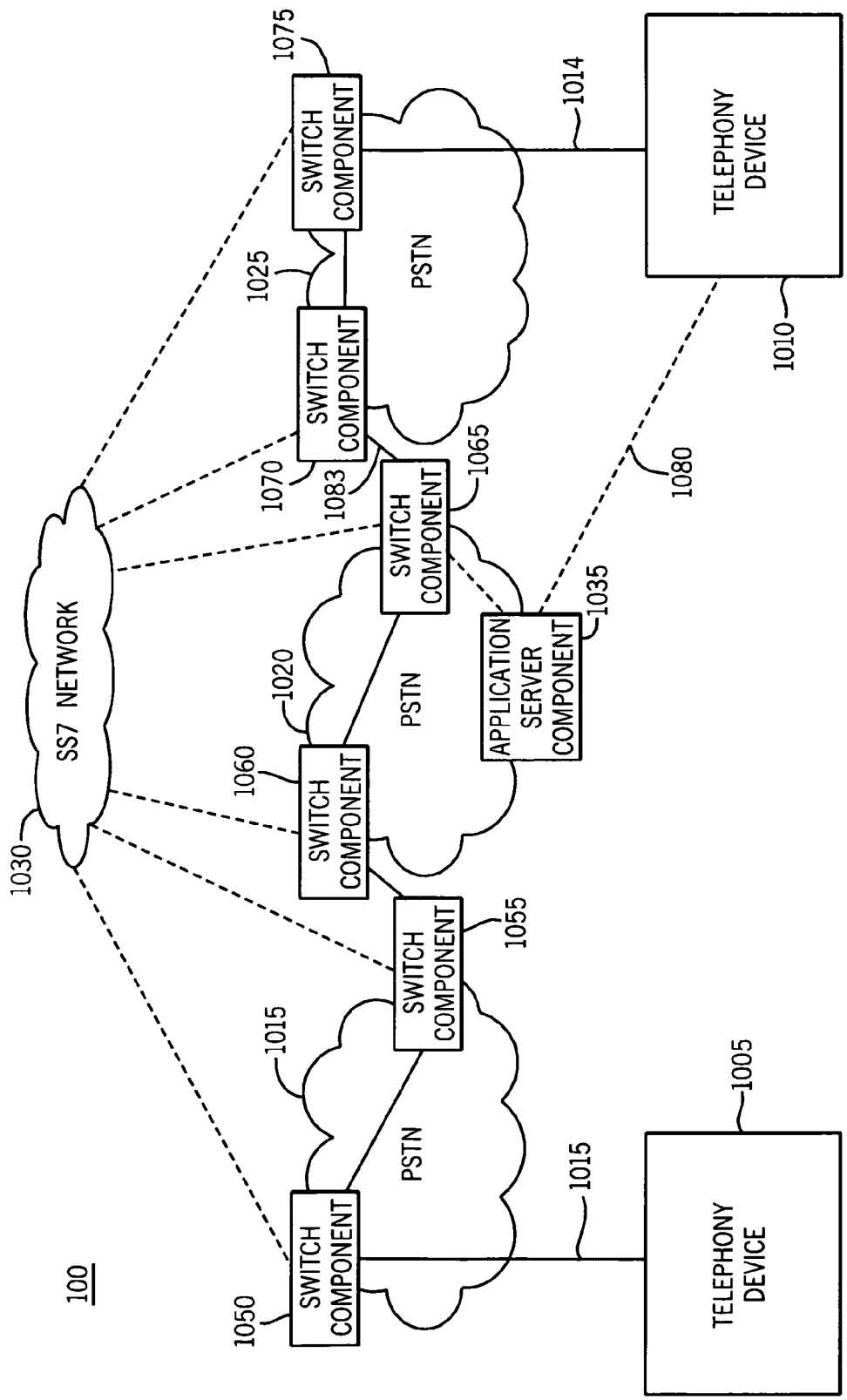
FIG. 10 is a representation of another exemplary implementation of the apparatus of FIG. 1.

Turning to FIG. 10, the apparatus 100 in one example comprises one or more telephony devices 1005 and 1010, and one or more networks 1015, 1020, 1025, and 1030. The network 1020 provides one or more line-side services to one or more users of the telephony device 1005 and 1010. The network 1020 comprises an application server component 1035. A remote telephony device, for example, the telephony device 1010, interacts with the line-side services through employment of one or more virtual signaling paths, for example, a data stream 1080, between the application server component 1035 and the remote telephony device, for example, the remote telephony device 1010. The network 1020 associates one or more line-side services with a user of the telephony device 1010 through employment of a network address associated with the telephony device 1010. A user of the telephony device 1010 employs the network address to register on the network 1020 and to establish the virtual signaling path, for example, the data stream 1080. The user of the telephony device 1010 employs the data stream 1080 to establish the virtual bearer path 1083 between the network 1020 and the telephony device 1010, as is similar to FIGS. 5-8.

For example, the telephony device 1010 communicates with the application server component 1035. A user of the telephony device 1010 registers with the application server component 1035. The application server component 1035 and the telephony device 1010 cooperate in one example to establish the data stream 1080. The application server component 1035 and switch components 1060 and 1075 cooperate to establish the virtual bearer path 1083 between a switch component 1060 on the network 1020 and a switch component 1075 on the network 1025. The user of the telephony device 1010 employs the data stream 1080 to interact with the one or more line-side services provided by the network 1020, for example, initiating a call from the network 1020 to the telephony device 1005.

The apparatus 100 in one example comprises a plurality of components such as computer software and/or hardware components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art.

The apparatus 100 employs at least one computer-readable media. One example of a computer-readable medium for the apparatus 100 comprises an instance of a recordable data storage medium such as one or more of a magnetic, electrical, optical, biological, and atomic data storage medium. The recordable data storage medium in one example comprises the storage device 101. An exemplary component of the apparatus 100 employs and/or comprises a set and/or series of computer instructions written in or implemented with any of a number of programming languages, as will be appreciated by those skilled in the art.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. A network, comprising:
one or more application server components that employ one or more data streams to provide to a telephony device on a remote network for a user one or more line-side services associated with a network address on a home network for the user, said one or more application server components being operable to employ the network address to determine the one or more line-side services, wherein at least one of the one or more line-side services is a notification event from one or more of the one or more application server components to the telephony device; and
wherein the one or more of the one or more application server components and the telephony device cooperate to establish one or more web portals; and
wherein the one or more of the one or more application server components provide one or more eXtended Markup Language (XML) interfaces to the telephony device through employment of the one or more web portals.

2. The network of claim 1,
wherein the one or more of the one or more application server components employ one or more of the one or more web portals to provide one or more of the one or more line-side services to the telephony device.

3. The network of claim 2, wherein the one or more of the one or more application server components employ one or more of the one or more data streams to provide for an interaction between the telephony device and the one or more line-side services associated with the network address on the home network.

4. The network of claim 3, wherein the one or more of the one or more application server components comprise a first application server component on the remote network for the user and a second application server component on the home network for the user; and
wherein the first application server component receives one or more user inputs from the telephony device through employment of the one or more of the one or more web portals; and
wherein the first application server component employs the one or more of the one or more data streams to provide one or more of the one or more user inputs to the second application server component; and
wherein the second application server component performs the one or more line-side services based on the one or more of the one or more user inputs.

5. The network of claim 4, wherein the first application server component and the second application server component cooperate to initiate one or more service events from the home network for the user based on the one or more of the one or more user inputs.

6. The network of claim 2, wherein the one or more of the one or more application server components provide a control interface to the telephony device through employment of the one or more web portals; and
wherein the one or more of the one or more application server components receive one or more user inputs from the telephony device through employment of the control interface; and
wherein the one or more of the one or more application server components employ the one or more data streams to perform one or more of the one or more line-side services based on the one or more user inputs.

7. The network of claim 1, wherein the one or more application server components employ the one or more data streams to register the user of the telephony device on the home network for the user.

8. The network of claim 7, wherein the one or more application server components employs an internet protocol to receive a remote number of the telephony device from the telephony device; and
wherein the one or more application server components associate the remote number of the telephony device with a network address on the home network for the user.

9. The network of claim 1, further comprising one or more switch components, wherein the one or more switch components comprise a switch component on the home network for the user; and
wherein the one or more application server components and the one or more switch components cooperate to establish a virtual bearer path between the telephony device and the switch component.

10. The network of claim 9, wherein the one or more application server components and the one or more switch component cooperate to establish the virtual bearer path for a duration of time.

11. The network of claim 10, wherein upon an expiration of the duration of time, the one or More application server components and the one or more switch component cooperate to tear-down the virtual bearer path.

12. The network of claim 10, wherein upon receipt of a request from the user of the telephony device, the one or more application server components and the one or more switch component cooperate to tear-down the virtual bearer path.

13. The network of claim 10, wherein upon receipt of a request from the user of the telephony device, the one or more application server components and the one or more switch component cooperate to establish the virtual bearer path.

14. The network of claim 9, wherein the one or more application server components and one or more of the one or more switch component cooperate to connect the virtual bearer path to an incoming call destined for a network address on the home network associated with the user.

15. The network of claim 9, wherein the telephony device initiates a remote call to a called telephony device, and wherein the one or more application server components and one or more of the one or more switch components cooperate to connect the virtual bearer path to the remote call.

16. The network of claim 1, wherein one or more of the one or more application server components and the telephony device cooperate to establish one or more web portals; and
    wherein the one or more of the one or more application server components employ the one or more web portals to provide one or more service events to the telephony device for a service address on the home network for the user.

17. The network of claim 16, further comprising one or more switch components, wherein the one or more of the one or more application server components employ the one or more of the one or more web portals to receive an acceptance of the incoming call from the telephony device on the remote network for the user; and
    wherein the one or more of the one or more application server components and the one or more switch components cooperate to connect the incoming call to the telephony device on the remote network of the user.

18. The network of claim 1, wherein one or more of the one or more application server components comprise a first application server component and a second application server component; and
    wherein the first application server component and the second application server component cooperate to establish the one or more data streams between the first application server component and the second application server component.

19. The network of claim 17, further comprising one or more switch components, wherein the one or more switch components employ one or more messages to invoke a service, and wherein an identifier comprises an address associated with the first application server component; and
    wherein the first application server component employs one or more of the one or more switch components to provide the identifier to the second application server component within one or more of the one or more messages.

20. The network of claim 1, further comprising:
    one or more switch components;
    wherein the one or more application server components cooperate with the one or more switch components to provide the one or more line-side services to the telephony device on the remote network for the user.

21. The network of claim 20, wherein the one or more application server components receive one or more user inputs from the telephony device; and
    wherein the one or more application server components communicate the one or more user inputs to the one or more switch components; and
    wherein the one or more application server components and the one or more switch components cooperate to perform the one or more line-side services based on the one or more user inputs.

22. The network of claim 20, wherein the one or more switch components comprise a switch component on the home network for the user; and
    wherein the one or more application server components and the one or more switch components cooperate to establish a virtual bearer path between the switch component and the telephony device.

23. The network of claim 22, wherein the one or more application server components and the one or more switch components establish the virtual bearer path for a duration of time, and wherein the switch component connects the virtual bearer path to an incoming call for a telephony device on the home network of the user; and
    wherein the one or more application server components and the switch component cooperate to maintain the virtual bearer path upon termination of the incoming call.

24. The network of claim 22, wherein the one or more application server components and the switch component cooperate to establish the virtual bearer path upon receipt of a service event for the network address of a telephony device on the home network of the user; and
    wherein the one or more application server components and the switch component cooperate to tear-down the virtual bearer path upon termination of the incoming call.

25. The network of claim 20, wherein the one or more switch components comprise a switch component on the home network for the user;
    and
    wherein the switch component establishes a virtual bearer path with the telephony device; and
    wherein the one or more application server components and the switch component cooperate to perform the one or more line-side services on the virtual bearer path.

26. The network of claim 25, wherein the switch component receives an incoming call for a network address on the home network for alb user; and
    wherein one or more of the one or more application server components instruct the switch component to employ the virtual bearer path to connect the incoming call to the telephony device.

27. A method, comprising the step of:
    providing, via one or more eXtended Markup Language (XML) interfaces, to a telephony device on a remote network for a user one or more line-side services associated with a network address on a home network for the user through employment of one or more data streams, the network address being employed to determine the one or more line-side services, wherein at least one of the one or more line-side services is a notification event provided to the telephony device.

28. The method of claim 27, wherein the step of providing to the telephony device on the remote network for the user the one or more line-side services associated with the network address on the home network for the user through employment of the one or more data streams further comprises the steps of:
    establishing a virtual bearer path with the telephony device;
    receiving one or more user inputs from the telephony device through employment of one or more of the one or more data streams; and providing one or more of the one or more line-side services on the virtual bearer path based on the one or more user inputs.

29. A computer-readable medium having computer executable instructions for performing steps, comprising:
   means in the computer-readable medium for providing, via one or more eXtended Markup Language (XML) interfaces, to a telephony device on a remote network for a user one or more line-side services associated with a network address on a home network for the user through employment of one or more data streams, the network address being employed to determine the one or more line-side services, wherein at least one of the one or more line-side services is a notification event provided to the telephony device.

30. The network of claim 1, wherein another one of the line-side services is a call initiation service.

31. The network of claim 1, wherein the telephony device interacts with the line-side services through employment of a local-loop that comprises a fiber optic connection.

32. The network of claim 1, wherein the telephony device interacts with the line-side services through employment of a local-loop that comprises a wireless connection.

33. The network of claim 1, wherein the one or more application server components communicate through employment of a Session Initiation Protocol (SIP).

34. The network of claim 1, wherein the one or more application server components communicate through employment of a User Datagram Protocol (UDP).

35. The network of claim 1, wherein the one or more application server components communicate through employment of a Transfer Control Protocol (TCP).

* * * * *